Figure 2:
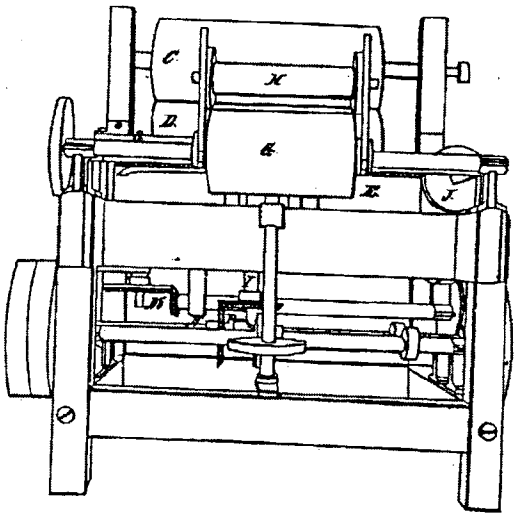

Sheet 1 - 3 Sheets.

S. Couillard, Jr.
Wool Combing Mach.

RE. No. 9.
8952X

Reissued Jul. 6, 1839.

Witnesses:
A Tucker
Henry C Dwyer

Inventor:
Samuel Couillard Jr

THE NORRIS PETERS CO., WASHINGTON, D. C.

Sheet 2 - 3 Sheets.
S. Couillard, Jr.
Wool Combing Mach.
RE. No. 9.
Reissued Jul. 6, 1839.
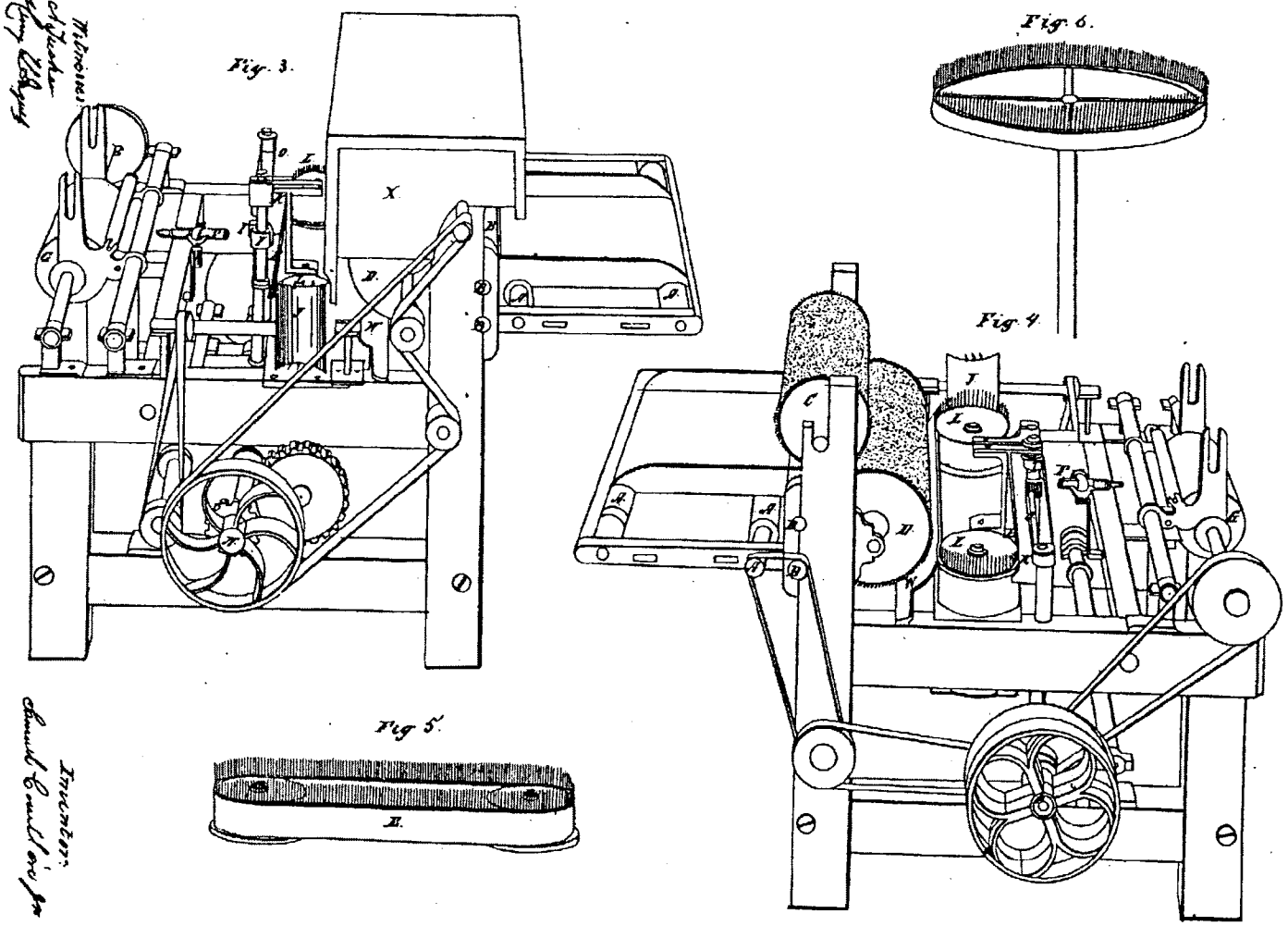
Witnesses
A. Tucker
Henry Hodges
Inventor:
Samuel Couillard Jr.
THE NORRIS PETERS CO., WASHINGTON, D. C.

S. Couillard, Jr.
Sheet 3 - 3 Sheets.
Wool Combing Mach.
RE No: 9.
Reissued Jul. 6, 1839.
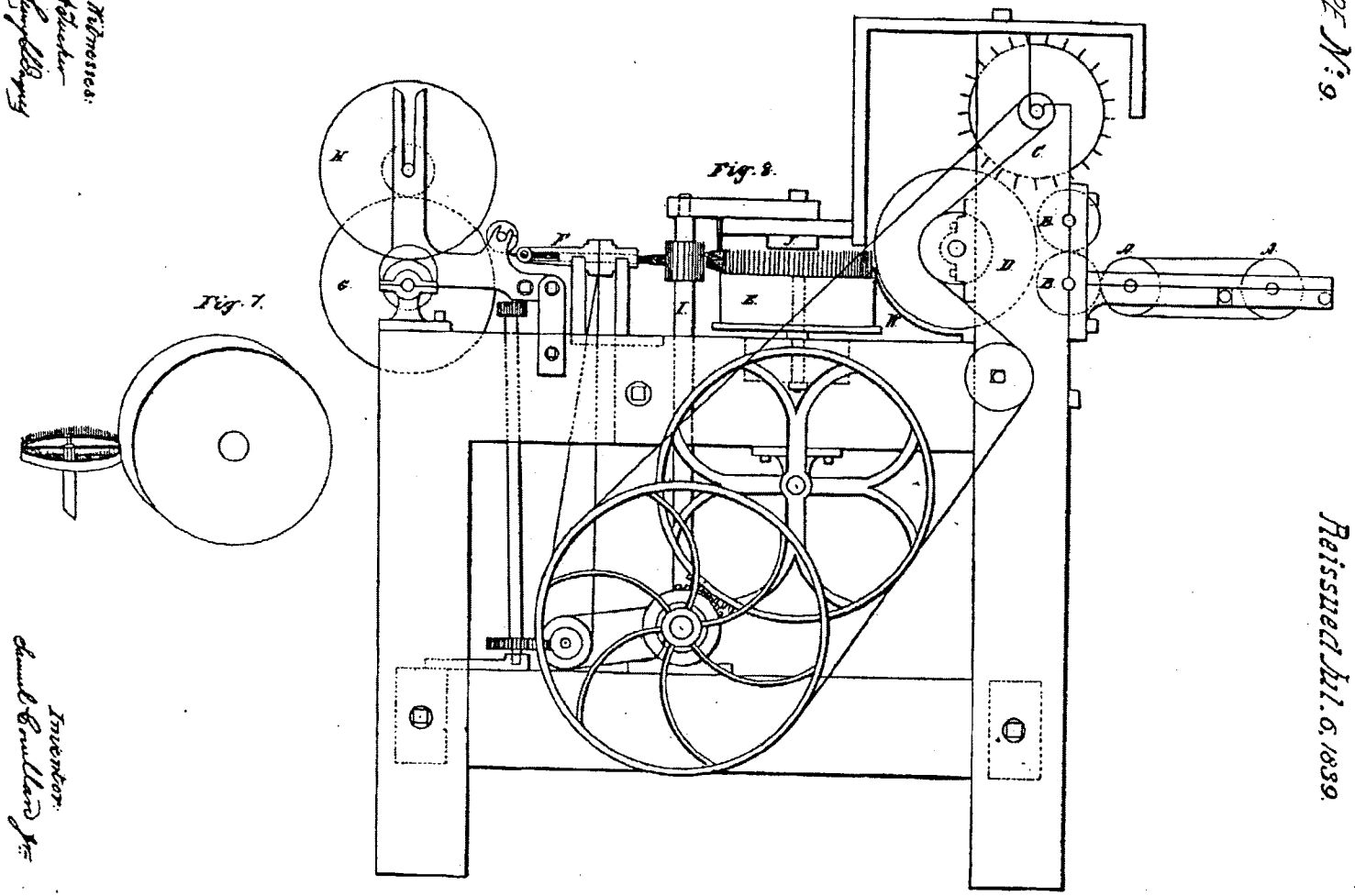
Witnesses:
A. Stocker
Henry B. Pagney
Inventor:
Samuel Couillard Jr.
THE NORRIS PETERS CO., WASHINGTON, D. C.

UNITED STATES PATENT OFFICE.

NEW ENGLAND WORSTED COMPANY, OF BOSTON, MASSACHUSETTS, ASSIGNEE OF SAMUEL COUILLARD, JR.

MACHINE FOR COMBING WOOL AND SEPARATING THE LONGER FROM THE SHORTER FIBERS.

Specification forming part of Letters Patent dated July 7, 1835; Reissue No. 9, dated July 6, 1839.

*To all whom it may concern:*

Be it known that SAMUEL COUILLARD, Jr., has invented a new and useful improvement in the art of combing wool and separating the longer from the shorter fibers, and forming the same into roving when required, an imperfect description and specification whereof have been heretofore given, whereupon Letters Patent have been heretofore granted to the said COUILLARD, bearing date the 7th day of July, in the year of our Lord 1835, for the said invention and improvement under the title of "A new and useful improvement in the art of combing wool," for the term of fourteen years from the date of said Letters Patent; and the said COUILLARD thereafterward, on the 24th day of July in the same year, by his deed of that date by him signed, sealed, and delivered, assigned all his right, title, and interest in the same invention and improvement and Letters Patent to Michael H. Simpson, of said city of Boston, a citizen of the United States of America, which assignment was duly recorded in the office of the Secretary of State of the United States of America, according to law; and the said Simpson on the same 24th day of July, by his deed of that date by him signed, sealed, and delivered, assigned all his right, title, and interest in the said invention and improvement and Letters Patent to Samuel Whitwell, George Bond, Benjamin Seaver, and George Wm. Bond, all of said city of Boston, merchants, and citizens of the said United States, which assignment was also duly recorded in the office of the said Secretary of State of the United States, according to law, which Letters Patent were deemed inoperative by reason of the imperfections of the said description and specification, happening through inadvertence and mistake, without any fraudulent or deceptive intention, and were surrendered by the said Samuel Whitwell, George Bond, George W. Bond, and Benjamin Seaver, the assignees thereof, to the Secretary of State of the said United States, for the purpose of obtaining new Letters Patent for the same invention and improvement, and thereupon new Letters Patent for the same invention and improvement, a further description and specification whereof were given by the said COUILLARD, were granted to the said Samuel Whitwell, George Bond, Benjamin Seaver, and George Wm. Bond, the assignees of the said invention and improvement, bearing date the 16th day of June, in the year of our Lord 1836, for the term of fourteen years from the 7th day of July, in the year of our Lord 1835; and the said Samuel Whitwell, George Bond, Benjamin Seaver, and George W. Bond thereafterward, on the 19th day of April, in the year of our Lord 1837, by their deed, by them signed, sealed, and delivered, assigned all their right, title, and interest in the said invention and improvement to the NEW ENGLAND WORSTED COMPANY, which last-mentioned Letters Patent are deemed inoperative by reason of a defective and insufficient description and specification of the said invention and improvement, happening through inadvertence and mistake, and without any fraudulent or deceptive intention, which last-mentioned Letters Patent have been surrendered to the Commissioner of Patents for the purpose of having new Letters Patent issued in due form according to law to the said NEW ENGLAND WORSTED COMPANY, the assignees of the said invention and improvement, for the same invention and improvement for the residue of the period yet unexpired for which the original Letters Patent were granted, as aforesaid, in accordance with the corrected description and specification hereby given by the said COUILLARD, which invention and improvement the said COUILLARD for that purpose does describe and specify as follows—that is to say, for the better understanding thereof he refers to the drawings hereto annexed as a part of his description and specification.

The frame of the machine deemed most convenient for use is six feet long, three feet high, and three feet wide. The wool is placed upon a horizontal feed-belt running around two rollers, A A, Figures 3, 4, and 8, and passes through the feed-rollers B B, Figs. 3, 4, 8, which are about three inches in diameter and equal in length to the feed-belt, which is about two feet. The belt and feed-rollers are similar in all respects to those of a carding-machine. A card or toothed cylinder, D, Figs. 2, 3, 4, 8, about two feet and a half in length, is placed horizontally across the frame next to the feeding-rollers, its center being level with the upper surface of the feeding-belt, and its surface being nearly in contact with said rollers. Its diameter may be varied as convenience requires, though cylinders of one foot or more diameter are better than smaller ones. This cylinder is called a "card" or "toothed" cylinder, because, though it is preferred in general, when clothed in the same manner as a common wool-card, yet a great variety of teeth, differing in form, size, length, mode of setting, and breadth of space between them, may be used upon it to more or less advantage, depending in some measure on the description of wool to be combed.

Figure 1:
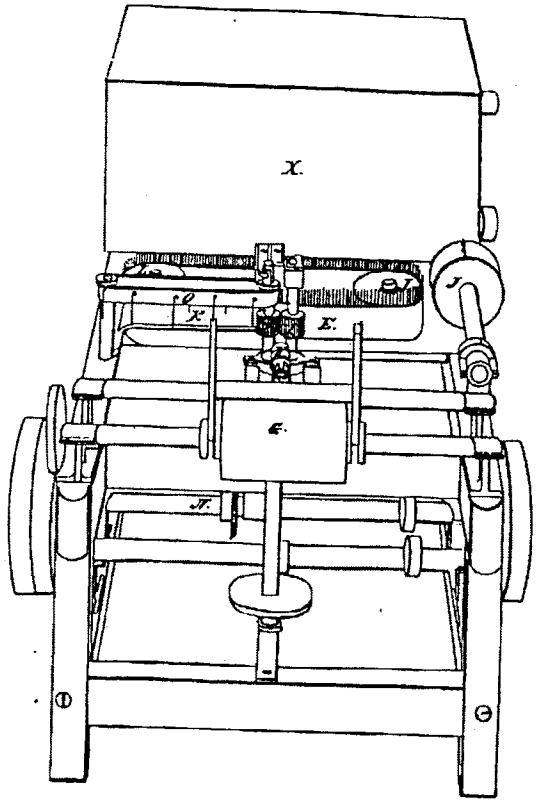

Said COUILLARD has used among others the following kind, made of steel wire, to wit: a straight tooth about two inches in length and about three-sixteenths of an inch in diameter at the bottom, tapering and pointed, and another of a hawk's-bill form, about half an inch in length and about one-eighth of an inch in diameter and pointed. These were at some times fixed directly into the cylinder and at others into lags, varying from four to sixteen in number, having one row of teeth in each and being secured to the cylinder across its surface. The hawk's-bill teeth will operate on some descriptions of wool with the best effect. They should not exceed about three-fourths of an inch in length and should be placed as near together as they conveniently may be, so as to bring the greatest number of teeth to act upon the wool. This cylinder should be about six inches longer than the feed-rollers, and the feed-frame should be placed at that end of the cylinder which is farthest from where the wool in the revolving comb first appears in the form of a fringe, so that some of the teeth of the card or toothed cylinder which do not receive the wool from the feeding-rollers may be left free to act upon and comb the wool which has been already lodged in the teeth of the revolving comb or fringe-belt. This cylinder revolves with great velocity and takes the wool in an upward direction from the feeding-rollers into its teeth, which are set pointing forward in the direction of the motion of the cylinder, and carries it around upon the surface to its opposite side, where it combs the wool in a downward direction into the teeth of a revolving comb or toothed belt, E, Figs. 1, 2, 3, 4, 5, and 8, denominated the "revolving comb" or "fringe-belt." A curve of iron or other metal (marked W, Figs. 3, 4, 8,) is attached to the frame, with a smooth interior surface made to conform to the periphery of the card or toothed cylinder, and making about a quarter of a circle, corresponding in width with the length of the cylinder, having its upper edge close to the bottom of the teeth in the revolving comb or fringe-belt, and extending down nearly in contact with the teeth upon the card or toothed cylinder, and is so fixed as to counteract the effect of the centrifugal action of the cylinder and cause the wool, when thrown into the revolving comb or fringe-belt by the toothed cylinder, to be kept in contact with the teeth of the cylinder, so as to be acted upon by them. The wooden fender X, Figs. 1, 3, 8, comes down to the inner side of the teeth in that part of the revolving comb or fringe-belt which is nearest to the cylinder, and serves to prevent the wool from being thrown by the action of the cylinder too far over or entirely beyond the teeth in the revolving comb or fringe-belt. To cause the wool on said cylinder D to lie more loosely on the surface, a toothed or card cylinder, called a "fancy," (marked C, Figs. 2, 4, 8,) is placed over the cylinder D to operate the same as a fancy does upon a common carding-machine. The revolving comb or fringe-belt E is about three inches wide, and is made of two thicknesses of firm thick leather, and the teeth are set in one row in the upper edge, between two thicknesses of leather glued together, and are about one-eighth of an inch asunder, projecting above the belt about one inch and one-half of an inch, with their points upward, and being about one-sixteenth of an inch in diameter at the bottom, and tapering to a point like a tailor's needle. This revolving comb or fringe-belt revolves around two perpendicular pulleys, L L, Figs. 1, 3, 4, six inches in diameter. Their position is level with each other above the frame. Their centers are a little within it, they standing opposite to each other. The revolving comb or fringe-belt is caused to revolve by the action of one of those pulleys, which is driven by a small bevel-gear, M, Fig. 2, and is strained tightly between them by the other pulley, which is caused to revolve by the friction of the belt. The motion of the comb or fringe-belt is slower than that of the cylinder D. The points of the teeth in the revolving comb or fringe-belt are level with the center of the card-cylinder D, and as nearly in contact with its surface as may be without touching. The fibers of wool lying loosely upon the surface of the cylinder D are partly caught in the points of teeth, and are thrown outward by centrifugal force in the revolution of the cylinder and by the operation of the fancy, and are from time to time caught in the points of the teeth of the revolving comb or fringe-belt, as in its revolution it passes by the cylinder, and those which are not caught at first, or which are slightly or imperfectly caught, or which are combed entirely from the other fibers, are carried around upon the cylinder until they are lodged or deposited upon the teeth of the revolving comb or fringe-belt. The ends of those fibers lodged in the teeth of the revolving comb or fringe-belt which are long enough to be acted upon by the teeth of the card or toothed cylinder are from time to time, as in the revolution of the comb or fringe-belt they pass by the card or toothed cylinder, combed in a direction outward and downward by the teeth of the card or toothed cylinder, and those which in the process of combing are taken from the fringe on the revolving comb or fringe-belt are carried around upon the cylinder until they are afterward caught in the teeth of the said revolving comb or fringe-belt.

While the revolving comb or fringe belt is moving from one end of the cylinder to the other and around the pulleys, and the cylinder D is operating in its swift motion, as before described, the wool appears in the teeth in the form of fringe. The ends of the longer fibers of course extend outward the farthest from the teeth, and the short ones a less distance, so in proportion to their various lengths. As the wool in the form of a fringe passes around on the revolving comb or toothed fringe-belt, it is swept toward a pair of draw-rollers, J I, Figs. 1, 2, 3, 4, 8, one of which is fluted and the other is plain, but the last being covered with leather and pressed against the former by a spring, or otherwise becomes fluted by use. These draw-rollers stand perpendicularly within the frame about one-half of the distance from the left end of the revolving comb or toothed fringe-belt, or where the wool in the form of a fringe appears to the opposite end of the belt, and are two inches in diameter, their centers standing about two inches from the revolving comb or fringe-belt, and are driven by the bevel-gear P, Fig. 2. A leather belt (marked O, Figs. 1, 2, 3, 4) with wires extending downward from the edge about three inches long passes around the draw-rollers and a pulley placed a little outside or on the frame. The wire fingers in this belt serve to incline and direct the ends of the fibers of wool over a smooth metallic table, K, Figs. 1, 2, 3, 4, toward the draw-rollers, the motion of this belt being about four times quicker than that of the revolving comb or fringe-belt and the table extending along the side of the tooth fringe-belt from its left end to the draw-rollers. The fluted draw-roller is caused to revolve by a bevel-gear upon the main shaft N, Figs. 1, 3, 4, communicating with a bevel-gear on the shaft of said roller. The other draw-roller, being closely pressed against it, is caused to revolve with it by friction, and the longer fibers of the wool which extend far enough from the revolving comb or fringe-belt to be removed by the draw-rollers are by them drawn out from the fringe and pass through them into and through a revolving bailed tube, F, Figs. 1, 3, 4, 8, and are wound upon a bobbin, H, Figs. 2, 8, in the form of a roving, which is moved by the cylinder G, Figs. 1, 2, 3, 4, 8. The roving may be run off into a can instead of being run upon a bobbin. The wool which remains in the revolving comb or fringe-belt which has passed these draw-rollers consists, of course, of the shorter fibers of the wool. These short fibers and knobby parts which remain in the teeth of the revolving comb or fringe-belt must be taken out from the teeth, so as to clear the teeth wholly for receiving other fibers from the card or toothed cylinder, when, by the revolution of the revolving comb or fringe-belt, they are again brought near to and pass by it. This may be done by means of a swiftly-revolving toothed cylinder J, Figs. 1, 2, 3, 4, 8, whereby they are taken out upward from the teeth and thrown downward from the opposite side into a box, to which box may be fitted a circular covering extending over the toothed wheel or cylinder J at all points except on the side next to the revolving comb or fringe-belt; but neither the box nor the covering are essential parts of the machine. In this way of drawing wool from the revolving comb or fringe-belt it can be easily seen that by placing a number of pairs of draw-rollers at different distances from the belt various lengths of wool can be drawn from it.

As many pairs of rollers may be used as occasion may require; but ordinarily one pair only is used. If wool in the state as it comes from the picker, is used, a common card-machine is placed in front of the combing-cylinder the doffer of the card-machine coming nearly in contact with the cylinder, which receives the wool therefrom. In this case the cylinder should be longer than the card-machine, more effectually to comb the wool, before described.

Instead of the revolving fringe-belt, the said COUILLARD has used a comb in the form of a disk, Fig. 6, revolving horizontally with such teeth, as aforesaid, set upright on the outer edge, between it and a leather belt, with a hoop over it to hold the teeth more firmly. Such a disk or wheel, with teeth, as aforesaid, firmly fixed in any convenient way perpendicularly upon or at the outer edge thereof, will answer tolerably well, especially if the card or toothed cylinder be made concave, so as to conform to the periphery of the disk or wheel, and so that all the teeth of the cylinder in its revolution may come nearly in contact with the teeth of the disk or wheel, (see Figs. 6 and 7;) but I consider a revolving toothed belt for all the purposes aforesaid as far preferable to a disk or wheel.

The disk or wheel may be moved in the same manner as the principal pulley of the belt E is moved, or by a worm-gear. The disk used by me was eleven inches in diameter, and the cylinder used in connection with it was about two feet in diameter and about three inches in length; but the disk or wheel may be advantageously increased in diameter and the cylinder in length.

It is deemed unnecessary to say that the revolving comb or fringe-belt may be made of other and different substances, and that the teeth may be fixed in various ways, as must be obvious to all machinists of ordinary skill; but it is important that the teeth should be made to pass successively along, for some considerable distance, near the surface of the cylinder, in order to effect in the best manner the purpose aforesaid.

What is claimed as the invention of the said COUILLARD is—

1. The revolving comb or toothed fringe-belt, in connection and combination with the revolving card or toothed cylinder, described as aforesaid.

2. The revolving toothed disk or wheel, in the like connection and combination, described as aforesaid.

3. The fender, described as aforesaid, in combination with the revolving comb and toothed cylinder, described as aforesaid.

4. The curve, described as aforesaid, in combination with the revolving comb and toothed cylinder, described as aforesaid.

5. The combination of the revolving toothed cylinder, the revolving comb or fringe-belt, the fender, and curve, described as aforesaid.

In testimony that the foregoing is a true description and specification of the said invention of the said COUILLARD, the said COUILLARD has hereunto set his hand and seal this 1st day of May, in the year of our Lord 1839, and the said NEW ENGLAND WORSTED COMPANY, in testimony of the truth of the facts above recited, have hereto also, by DAVID DUDLEY, their president, thereto authorized, affixed the seal of said corporation hereto the day and year last aforesaid.

SAMUEL COUILLARD, JR. [L. S.]

Witnesses:

A. TUCKER,

HENRY L. JACQUES.

[L. S.] DAVID DUDLEY,

*President.*

Witnesses to signature of David Dudley:

HENRY L. JACQUES,

A. TUCKER.